US007869793B2

(12) United States Patent
Ahn et al.

(10) Patent No.: US 7,869,793 B2
(45) Date of Patent: Jan. 11, 2011

(54) METHOD AND APPARATUS FOR PREVENTING UNAUTHORIZED USE OF MOBILE TERMINAL

(75) Inventors: Seong-Woo Ahn, Yongin-si (KR); Sang-Min Bae, Suwon-si (KR); Jin-Taek Noh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 683 days.

(21) Appl. No.: 11/932,463

(22) Filed: Oct. 31, 2007

(65) Prior Publication Data

US 2008/0108325 A1 May 8, 2008

(30) Foreign Application Priority Data

Oct. 31, 2006 (KR) ...................... 10-2006-0106928

(51) Int. Cl.
*H04M 1/66* (2006.01)
(52) U.S. Cl. ...................... 455/411; 455/410; 380/247; 380/248; 380/249; 380/250; 713/189; 713/190
(58) Field of Classification Search ......... 455/410–411; 380/247–250; 713/189–194
See application file for complete search history.

(56) References Cited

U.S. PATENT DOCUMENTS 5,337,345 A 8/1994 Cassidy et al.

2006/0015748 A1* 1/2006 Goto et al. .................. 713/190
2006/0107032 A1* 5/2006 Paaske et al. .................. 713/2
2007/0092082 A1* 4/2007 Rush .......................... 380/277

FOREIGN PATENT DOCUMENTS

| KR | 1020040092575 | 11/2004 |
|---|---|---|
| KR | 1020060061609 | 6/2006 |
| KR | 1020060124215 | 12/2006 |

* cited by examiner

*Primary Examiner*—Kamran Afshar
*Assistant Examiner*—Chuong A Ngo
(74) *Attorney, Agent, or Firm*—The Farrell Law Firm, LLP

(57) ABSTRACT

A method and apparatus for preventing unauthorized use of a mobile terminal are provided, in which an execution code processor decrypts an Mobile Phone Certificate (MPC) using an MPC decryption code stored in it, when the mobile terminal is booted, an MPC processor compares a pre-stored MPC decryption execution code with the MPC decryption execution code, compares a pre-stored MPC encryption key with an MPC encryption key stored in the execution code processor. When the MPC decryption execution codes are identical, sets data required for an initial operation of the mobile terminal using an MPC management execution code included in a pre-stored MPC. When the MPC encryption keys are identical, decrypts Secured Code (SCode) blocks for execution of an application program, after executing the MPC management execution code. The execution code processor performs an operation program of the mobile terminal using the MPC management execution code and the decrypted SCode blocks.

7 Claims, 4 Drawing Sheets

METHOD AND APPARATUS FOR PREVENTING UNAUTHORIZED USE OF MOBILE TERMINAL

PRIORITY

This application claims priority under 35 U.S.C. §119(a) to a Korean Patent Application filed in the Korean Intellectual Property Office on Oct. 31, 2006 and assigned Serial No. 2006-106928, the entire disclosure of which is hereby incorporated by reference.

BACKGROUND OF THE INVENTION

1. Field of the Invention

The present invention generally relates to a method and apparatus for preventing unauthorized use of a mobile terminal. In particular, the present invention relates to a method and apparatus for preventing unauthorized use of its equipment number of a mobile terminal through user authentication.

2. Description of the Related Art

Mobile communications through mobile terminals have significantly affected our society in several different ways. Over the past few years, the number of mobile phone subscribers has increased exponentially and mobile terminals are now a necessity in every day life of ordinary people.

In a cellular mobile communication system being a major one of current mobile communication systems, a system operator provides voice and data service to mobile subscribers by installing Base Stations (BSs, i.e., cells) with certain coverage areas. A mobile terminal needs storage for storing data and codes. Major storage devices are Electrically Erasable Programmable Read Only Memory (EEPROM), flash Erasable Programmable Read Only Memory (EPROM), and Random Access Memory (RAM). Typically, storage of the mobile terminal stores a unique number allocated to the mobile terminal. The unique number is an Equipment Serial Number (ESN) in a synchronous cellular mobile communication system and an International Mobile Equipment Identifier (IMEI) in an asynchronous cellular mobile communication system. Hereinbelow, both ESN and IMEI are called "equipment number" commonly.

As described above, a mobile terminal has its unique equipment number. Every mobile communication provider can track a lost or stolen mobile terminal by its equipment number.

Despite the significance of the equipment number, there were no specified protections of the equipment numbers of mobile terminals in their early stage of development. As unauthorized users can store illegally acquired equipment numbers in lost or stolen mobile terminals, it is difficult to track the lost or stolen mobile terminals. As a result, the lost or stolen mobile terminals can be used for illegitimate purposes.

To prevent unauthorized change of equipment numbers, mobile terminal manufacturers encrypt the equipment numbers in hardware to make it impossible for unauthorized users to assign new equipment numbers to mobile terminals. Although it is regulated that an equipment number be written only once in a mobile terminal, the validity of an equipment number is not verified and equipment number-based software execution codes within a mobile terminal is not protected. Thus, a mobile terminal is vulnerable to an unauthorized use through hacking of the software execution codes.

With reference to FIG. 1, a conventional user authentication process for a mobile terminal will be described. The mobile terminal decrypts encrypted authentication information (e.g. an equipment number) during software execution in step 101 and compares current authentication information (i.e., authentication information decrypted and stored during system initialization) with the decrypted authentication information in step 102. When the current authentication information is identical to the decrypted authentication information in step 103, the mobile terminal executes an authentication information-based software execution code in step 104. When the current authentication information is different from the decrypted authentication information, the mobile terminal is locked by disabling the execution of the software execution code, thereby prohibiting an unauthorized user from using the mobile terminal in step 105.

When the malicious user nullifies step 103 by unlawfully modifying software of the mobile terminal to proceed the authentication procedure from step 102 directly to step 104, efforts to encrypt authentication information are useless.

Accordingly, authentication information-based software as well as a storage having authentication information for mobile terminal authentication should be protected against unauthorized use of a mobile terminal.

However, the conventional authentication technology illustrated in FIG. 1 simply encrypts the equipment number of a mobile terminal such as an IMEI or an ESN, without protecting software execution codes associated with encryption and change of authentication information required for mobile terminal authentication. Therefore, nullification of a software execution code that compares encryption keys by hacking leads to unauthorized use of the mobile terminal.

SUMMARY OF THE INVENTION

An aspect of the present invention is to solve at least the problems and/or disadvantages and to provide at least the advantages described below. Accordingly, an aspect of the present invention is to provide a method and apparatus for preventing unauthorized use of a mobile terminal by encrypting the equipment number of the mobile terminal.

Another aspect of the present invention provides a method and apparatus for preventing unauthorized use of a mobile terminal by storing the equipment number of the mobile terminal.

A further aspect of the present invention provides a method and apparatus for preventing unauthorized use of a mobile terminal by protecting equipment number-based software.

In accordance with an aspect of the present invention, there is provided a method for preventing unauthorized use of a mobile terminal, in which an execution code processor decrypts an Mobile Phone Certificate (MPC) using an MPC decryption execution code stored in the execution code processor, when the mobile terminal is booted, an MPC processor compares an MPC decryption execution code pre-stored in the MPC processor with the MPC decryption execution code stored in the execution code processor, the MPC processor compares an MPC encryption key pre-stored in the MPC processor with an MPC encryption key stored in the execution code processor, when the MPC decryption execution codes are identical, the MPC processor sets data required for an initial operation of the mobile terminal using an MPC management execution code included in an MPC pre-stored in the MPC processor, when the MPC encryption keys are identical, the MPC processor decrypts Secured Code (SCode) blocks required for execution of an application program, after executing the MPC management execution code, and the execution code processor performs an operation program of the mobile terminal using the MPC management execution code and the decrypted SCode blocks.

In accordance with another aspect of the present invention, there is provided an apparatus for preventing unauthorized use of a mobile terminal, in which an execution code processor decrypts an MPC using an MPC decryption code stored in the execution code processor, when the mobile terminal is booted, requests decryption of the decrypted MPC, and performs an operation program of the mobile terminal using an MPC management execution code and decrypted SCode blocks, when the decrypted MPC is valid, and an MPC processor compares an MPC decryption execution code pre-stored in the MPC processor with the MPC decryption execution code, upon request for verification of the decrypted MPC, compares an MPC encryption key pre-stored in the MPC processor with an MPC encryption key stored in the execution code processor, when the MPC decryption execution codes are identical, sets data required for an initial operation of the mobile terminal using an MPC management execution code included in an MPC pre-stored in the MPC processor, when the MPC encryption keys are identical, and decrypts the SCode blocks required for execution of an application program.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method and apparatus for preventing unauthorized use of a mobile terminal by writing encrypted authentication information (e.g. an equipment number) on an erasable memory but allowing only an authorized user to change the authentication information. The authorized user is allowed to change an initial equipment number only once when an encryption key given by the authorized user is identical to a key used for encrypting the authentication information to prevent unauthorized change of the equipment number by deleting an associated software execution block.

Figure 1:
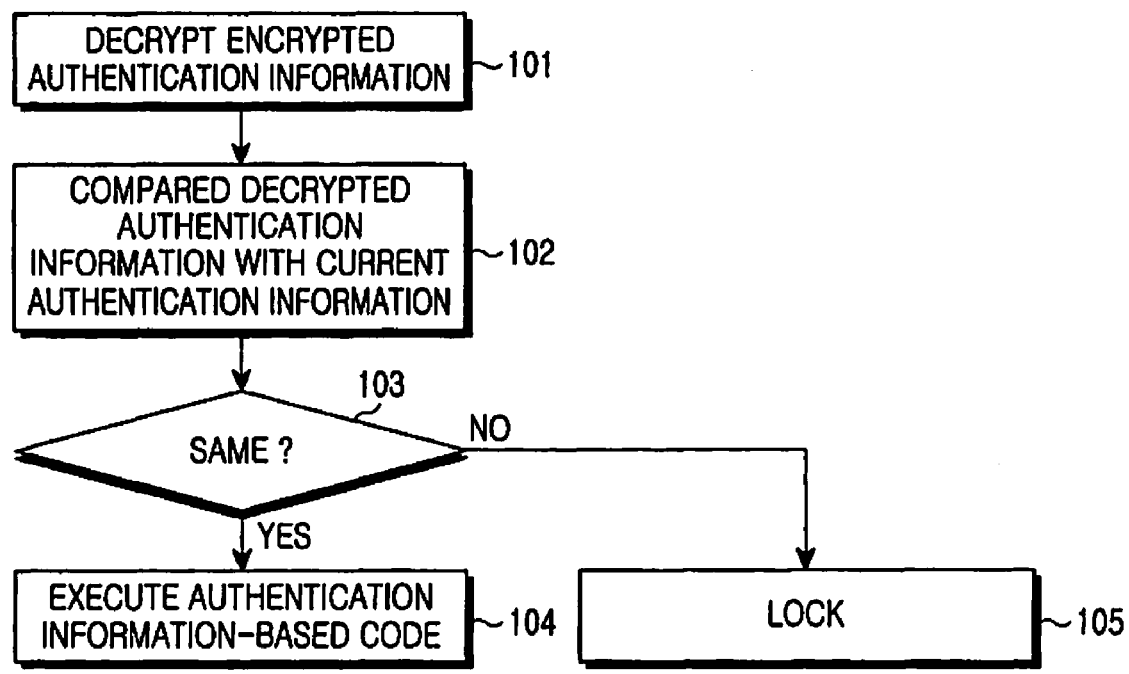
FIG. 1 is a flowchart of a conventional user authentication method for a mobile terminal.

As described with reference to FIG. 1, to protect parameters being authentication information including the equipment number of a mobile terminal and to prevent unauthorized use of the mobile terminal through unauthorized change of the parameters, both the parameters and authentication information-based software should be protected.

The authentication information is protected usually by encryption. When an authentication algorithm is not made public, the authentication information is secure. However, when software that operates the encryption algorithm is not protected, the protection of the authentication information is meaningless.

The conventional hardware-based protection or data encryption is not effective in terms of additional cost and protection of software execution codes. Therefore, the equipment number of a mobile terminal is vulnerable to unauthorized use. In this context, the present invention provides a method and apparatus for preventing unauthorized use of a mobile terminal by protecting its equipment number and software without adding hardware.

Hereinbelow, the term "execution code" is used interchangeably with the term "software code".

Figure 2:
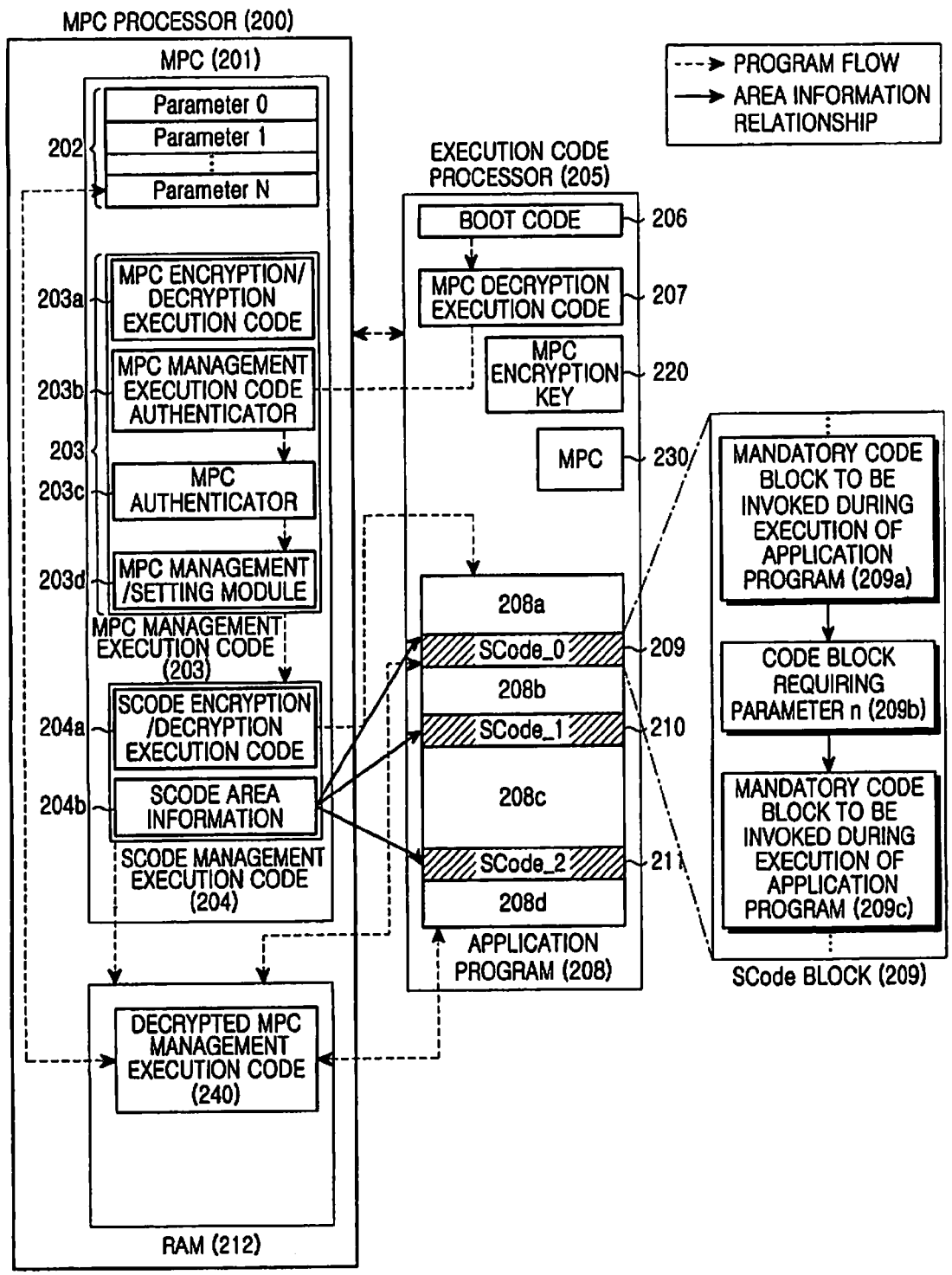
FIG. 2 is a block diagram of an apparatus for preventing unauthorized use of an equipment number according to the present invention.

FIG. 2 is a block diagram of an apparatus for preventing unauthorized use of an equipment number according to the present invention.

Referring to FIG. 2, the apparatus largely includes a Mobile Phone Certificate (MPC) processor 200 for storing an MPC 201 and performing operations associated with MPC-based mobile terminal authentication, and an execution code processor 205. According to the present invention, the MPC 201 is a module that encrypts and stores parameters, execution codes, and codes.

The MPC 201 is a certificate being a collection of materials including authentication information required for authentication and operations of the mobile terminal. The MPC 201 is encrypted for protection against external attacks and stored in the MPC processor 200. Thus, the authentication information is protected against external unauthorized change.

The MPC 201 includes a set of parameters 202, an MPC management execution code 203, and a Secured Code (SCode) management execution code 204.

The parameter set 202 includes n+1 (n is a real number, starting from 0) parameters. In the present invention, "parameter" is used interchangeably with "authentication information". The parameters may include an equipment number such as an IMEI or information by which a service provider or a service identifies the mobile terminal.

The MPC management execution code 203 includes an MPC encryption/decryption execution code 203a, an MPC management execution code authenticator 203b, an MPC authenticator 203c, and an MPC management/setting module 203d. The MPC management execution code 203 is encrypted and stored in the MPC 201.

The MPC encryption/decryption execution code 203a stores an execution code for encrypting and decrypting the MPC 201. The MPC management execution code authenticator 203b authenticates the MPC management execution code 203 by comparing an MPC decryption execution code 207 in the execution code processor 205 with the MPC decryption execution code of the MPC encryption/decryption execution code 203a.

After the MPC management execution code authenticator 203b authenticates the MPC management execution code 203, the MPC authenticator 203c authenticates the MPC 201 by comparing an MPC encryption key included in the parameter set 202 with an MPC encryption key 220 stored in the execution code processor 205.

The MPC management/setting module 203d has every interface function required for the execution code processor 205 to access the MPC 201 after the MPC authenticator 203c authenticates the MPC 201. The MPC management/setting module 203d also stores initial mobile terminal settings that have been made using the MPC 201 while booting the mobile terminal, initial mobile terminal settings that have been made using the MPC 201 while updating software, codes associated with MPC resetting during the software update, and all routines using the MPC 201. Hence, the mobile terminal can operate normally by decrypting an MPC and then executing the MPC management execution code 203 in an exemplary embodiment of the present invention. As illustrated in FIG. 2, the MPC management execution code 203 is within the MPC 201 and encrypted and stored by an encryption algorithm. Therefore, it is impossible to externally attack the MPC management execution code 203. Thus, the MPC management code 203 is protected against unauthorized use of a malicious user through a code change.

The SCode management execution code 204 manages SCode blocks 209, 210 and 211 of an application program 208, and temporarily decrypts and stores the SCode blocks 209, 210 and 211 in a RAM 212.

The SCode management execution code 204 includes an SCode encryption/decryption execution code 204a for encrypting/decrypting the SCode blocks 209, 210 and 211, and SCode area information 204b being information about the positions and sizes of the SCode blocks 209, 210 and 211. Hence, the SCode management execution code 204 functions to render the application program 208 to normally operate by decrypting the SCode blocks 209, 210 and 211 while booting the mobile terminal, or encrypting the application program 208 during software updating. Since the SCode management execution code 204 is encrypted within the MPC 201, it is protected against unauthorized use.

When the MPC decryption execution code 207 is authenticated by the MPC management execution code 203, the SCode management execution code 204 transfers the SCode blocks 209, 210 and 211 decrypted using the SCode decryption code to the RAM 212, and the application program 208 retrieves decrypted data of an encrypted SCode block from the RAM 212 and executes it. Thus, operations necessary to operate the mobile terminal are performed.

When the authentication of the MPC 201 is successful, the MPC processor 200 decrypts the MPC management execution code 203 and stores a copy of the decrypted MPC management execution code 240 in the RAM 212. Therefore, when the mobile terminal is power-off, the decrypted MPC management execution code 240 disappears from the RAM 212. Even though a malicious user turns on the mobile terminal, he cannot use the copy of the decrypted MPC management execution code 240 illegally.

The RAM 212 temporarily stores the decrypted MPC management execution code 240 and the SCode blocks decrypted by the SCode management execution code 204 until the mobile terminal is power-off.

In the execution code processor 205, a boot code 206 required for booting the mobile terminal, the MPC decryption execution code 207 required for authenticating the mobile terminal, and the application program 208 required for the normal operation of the mobile terminal are stored in an internal or external memory.

The application program 208 includes general non-encrypted code blocks 208a, 208b, 208c, and 208d and the SCode blocks 209, 210 and 211.

The SCode blocks 209, 210 and 211 are of a predetermined size, including codes for performing an authentication procedure using the MPC management execution code 203 in the application program 208. The SCode blocks 209, 210 and 211 have essential codes for performing the functions of the mobile terminal. The SCode blocks 209, 210 and 211 are stored in the execution code processor 205. Since the SCode blocks 209, 210 and 211 are encrypted, a Central Processing Unit (CPU) (not shown) of the mobile terminal cannot execute them and no external unauthorized modification can be made to them.

The SCode block 209 includes mandatory code blocks 209a and 209c that are necessarily invoked and a code block 209b that should use Parameter N stored in the MPC 201. The encrypted SCode blocks 209, 210 and 211 should read Parameter N from the MPC 201 during execution of the general non-encrypted code blocks 208a to 208d in the application program 208. Parameter N is one of the n+1 parameters.

The code blocks 209a and 209c are mandatory codes without which a program flow is interrupted, such as codes that process transmission of a user-input phone number to a Base Station (BS) during dialing. The code block 209b is a code block that needs information about the mobile terminal (e.g. IMEI) or provider information, such as for a call attempt and registration to a BS.

Therefore, the application program 208 requests information about Parameter N to the decrypted MPC management execution code 240 copied on the RAM 212, for the code block 208b. The decrypted MPC management execution code 240 transfers the requested information to the application program 208, referring to Parameter N stored in the parameter set 202, so that the application program 208 can perform a corresponding operation.

The above-described configuration nullifies a code attack that leads to nullification of authentication. Therefore, the application program 208 of the mobile terminal can perform a secure authentication. Even though the mobile terminal is booted, the encrypted SCode blocks 209, 210 and 211 should be decrypted to execute the application program 208. Thus, the MPC management execution code 203 is protected against attacks during the execution of the application program 208.

Also, the application program 208 has been stored in the execution code processor 205 since booting, more accurately since manufacturing.

In accordance with the present invention, when the mobile terminal is booted, the execution code processor 205 executes the boot code 206, decrypts an MPC using the MPC decryption execution code 207, and transfers the decrypted MPC to the MPC processor 200. Then, the MPC management execution code 203 of the MPC processor 200 compares the MPC decryption execution code 203a with the MPC decryption execution code 207 of the decrypted MPC. When the two MPC decryption execution codes are identical, the MPC management execution code 203 authenticates the MPC 201 itself.

As described above, when the authentication of the MPC 201 is successful, the MPC management execution code 203 notifies the SCode management execution code 204 of the successful authentication of the MPC 201. Then, the SCode management execution code 204 decrypts the SCode blocks 209, 210 and 211 of the application program 208 using the pre-stored SCode encryption/decryption code 204a and the SCode area information 204b and loads the decrypted SCode blocks 209, 210 and 211 on the RAM 212. Therefore, the codes of the decrypted SCode blocks 209, 210 and 211 are erased when the mobile terminal is power-off. Therefore, a malicious user cannot access the codes of the decrypted SCode blocks 209, 210 and 211 and even if the authentication of the MPC 201 is skipped through hacking, failed decryption of the SCode blocks 209, 210 and 211 impedes the execution of the application program 208.

Figure 3:
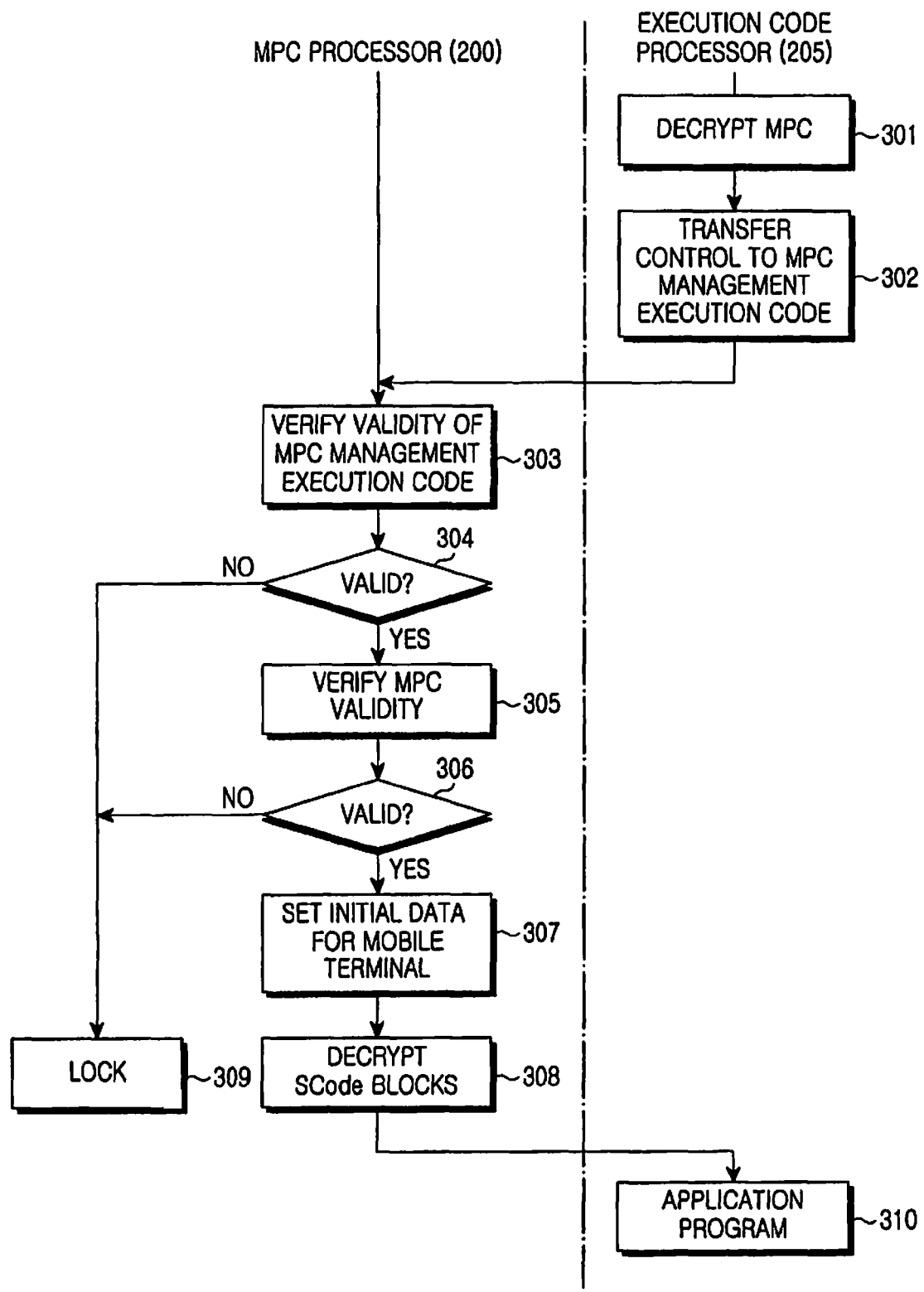
FIG. 3 is a flowchart of operations of a Mobile Phone Certificate (MPC) processor and an execution code processor when a mobile terminal is booted according to the present invention.

FIG. 3 is a flowchart of operations of the MPC processor and the execution code processor when the mobile terminal is booted according to the present invention.

Referring to FIG. 3, the execution code processor 205 decrypts an MPC 230 using the MPC decryption execution code 207 after executing the boot code 206 in step 301. Herein, the decrypted MPC 230 is temporarily generated.

In step 302, the execution code processor 205 transfers an operation control to the MPC processor 200. When the execution code processor 205 decrypts the MPC 230, the MPC management execution code 203 authenticates the MPC 230.

In step 303, the MPC management execution code authenticator 203b of the MPC management execution code 203 compares the MPC decryption execution code of the pre-stored MPC encryption/decryption execution code 203a with the MPC decryption execution code 207.

When the two MPC decryption codes are identical in step 304, the MPC authenticator 203c verifies the validity of the MPC 201 in step 305. When the two MPC decryption execution codes are different in step 304, every on-going operation of the mobile terminal is terminated in step 309.

In step 305, the MPC authenticator 203c compares the MPC encryption key 220 of the execution code processor 205 with an MPC encryption key being a backup of authentication information stored in the parameter set 202, to verify the validity of the MPC 201. In this manner, it is determined if the MPC 201 has been attacked externally.

When the two MPC encryption keys are different in step 306, every on-going operation of the mobile terminal is terminated in step 309.

When the MPC 201 turns out valid from the comparison in step 306, the MPC management/setting module 203d of the MPC management execution code 203 sets data necessary for an initial operation of the mobile terminal or performs an operation required for software updating in step 307. In step 308, the SCode management execution code 204 decrypts the SCode blocks 209, 210, 211 according to a command signal received from the MPC management execution code 203 and transfers the control to the application program 208 of the execution code processor 205.

In step 310, the application program 208 executes the SCode blocks 209, 210 and 211 and thus operates normally for an operation of the mobile terminal. Thus, the application program 208 is comprised of executable codes only.

Figure 4:
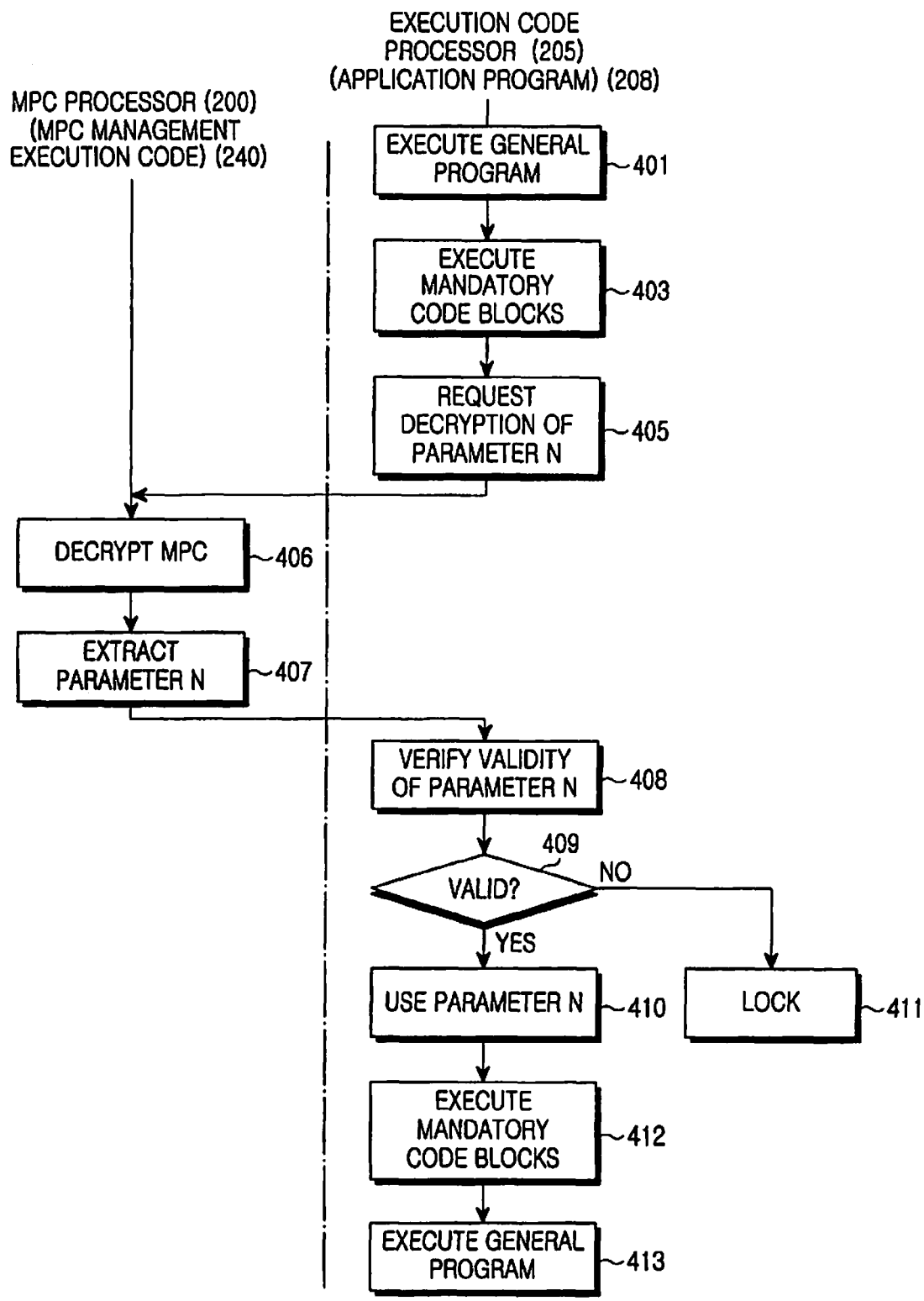
FIG. 4 is a flowchart of an operation of an application program for referring to authentication information of the MPC after the mobile terminal is booted according to the present invention.

FIG. 4 is a flowchart of an operation for referring to authentication information of the MPC 201 by the application program 208 after the mobile terminal is booted according to the present invention.

Referring to FIG. 4, the application program 208 executes a general program corresponding to the non-encrypted areas 208a to 208d in step 401. Then, the flow of the application program 208 transitions to execution of the SCode blocks 209, 210 and 211 in steps 403 and 405 and steps 408 through 413.

The application program 208 retrieves the mandatory code blocks that should be invoked from the RAM 212 and executes them in step 403. The codes of the code block are a requisite for normal operation of the mobile terminal. When the code blocks are associated with a call attempt, for example, they can be related to a mandatory operation such as an input of a phone number. Without step 403, the application program 208 cannot proceed to steps 405 through 413.

When Parameter N is required during the execution of the code blocks, the application program 208 requests the MPC 201 to decrypt the encrypted Parameter N in step 405.

In step 406, the decrypted MPC management execution code 240 decrypts the MPC 201 again to extract Parameter N from the parameter set 202. When the MPC 201 is decrypted while booting the mobile terminal, the parameters and the SCode management execution code 204 of the MPC 201 disappear from the RAM 212 after the MPC 201 is used, but the decrypted MPC management execution code 240 remains on the RAM 212. Therefore, the MPC 201 should be decrypted again to extract Parameter N. Therefore, the application program 208 invokes the decrypted MPC management execution code 240 from the RAM 212 and the decrypted MPC management execution code 240 decrypts Parameter N using an interface corresponding to Parameter N since the interface for invoking Parameter N is stored.

In step 407, the decrypted MPC management execution code 240 transmits the extracted Parameter N to the application program 208.

The application program 208 verifies the validity of Parameter N by comparing Parameter N of the MPC 230 pre-stored in the execution code processor 205 with the received Parameter N in step 408.

When Parameter N is valid in step 409, the application program 208 performs authentication using Parameter N in step 410 and performs an operation associated with the mandatory code blocks in step 412 and performs a general program of the mobile terminal in step 413.

When Parameter N is an IMEI for authentication, for example, the authentication of step 410 is IMEI-based authentication.

When Parameter N is not valid in step 409, the application program 208 is disabled, determining that the MPC 201 or its copy 230 of the execution code processor 205 has been attacked externally in step 411.

As is apparent from the above description, the present invention establishes mutual dependency between an MPC and codes that access the MPC. Therefore, the MPC cannot be decrypted with a non-authenticated code and codes are not decrypted without the MPC, thereby disabling execution of an application program. As codes that access a certificate as well as the certificate are protected, authentication information and authentication codes are protected against hacking attempts. Therefore, unauthorized use of a lost or stolen mobile terminal is prevented.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for preventing unauthorized use of a mobile terminal, comprising:

decrypting a Mobile Phone Certificate (MPC) using an MPC decryption execution code stored in an execution code processor by the execution code processor, when the mobile terminal is booted;

comparing an MPC decryption execution code pre-stored in an MPC processor with the MPC decryption execution code stored in the execution code processor by the MPC processor;

comparing an MPC encryption key pre-stored in the MPC processor with an MPC encryption key stored in the execution code processor by the MPC processor, when the MPC decryption execution codes are identical;

setting data required for an initial operation of the mobile terminal using an MPC management execution code included in an MPC pre-stored in the MPC processor by the MPC processor, when the MPC encryption keys are identical;

decrypting Secured Code (SCode) blocks required for execution of an application program by the MPC processor, after executing the MPC management execution code; and performing an operation program of the mobile terminal using the MPC management execution code and the decrypted SCode blocks by the execution code processor.

2. The method of claim 1, wherein the pre-stored MPC includes a set of parameters, the MPC management execution code, and an SCode management execution code, the parameter set including authentication information about the mobile terminal and parameters required for execution of the application program, the MPC management execution code including an encrypted MPC encryption/decryption execution code, an encrypted MPC management execution code authentication code, and an encrypted MPC management/setting code, and the SCode management execution code including an encrypted SCode encryption/decryption code and encrypted SCode block area information.

3. The method of claim 1, wherein the SCode blocks include at least one mandatory code block to be invoked during execution of the application program and at least one code block requiring a predetermined parameter.

4. An apparatus for preventing unauthorized use of a mobile terminal, comprising:

an execution code processor for decrypting a Mobile Phone Certificate (MPC) using an MPC decryption execution code stored in the execution code processor, when the mobile terminal is booted, requesting decryption of the decrypted MPC, and performing an operation program of the mobile terminal using an MPC management execution code and decrypted Secured Code (SCode) blocks, when the decrypted MPC is valid; and an MPC processor for, upon request for verification of the decrypted MPC, comparing an MPC decryption execution code pre-stored in an MPC processor with the MPC decryption execution code stored in the execution code processor, comparing an MPC encryption key pre-stored in the MPC processor with an MPC encryption key stored in the execution code processor, when the MPC decryption execution codes are identical, setting data required for an initial operation of the mobile terminal using the MPC management execution code included in an MPC pre-stored in the MPC processor, when the MPC encryption keys are identical, and decrypting the SCode blocks required for execution of an application program.

5. The apparatus of claim 4, wherein the MPC processor includes a set of parameters, an SCode management execution code, and the MPC management execution code, the parameter set including authentication information about the mobile terminal and parameters required for execution of the application program, the SCode management execution code for authenticating the decrypted MPC and decrypting the SCode blocks, when the decrypted MPC is valid, and an MPC authentication execution code for decrypting the SCode blocks using an SCode block management execution code, when the decrypted MPC is valid.

6. The apparatus of claim 4, wherein the pre-stored MPC includes a set of parameters, the MPC management execution code, and an SCode management execution code, the parameter set including authentication information about the mobile terminal and parameters required for execution of the application program, the MPC management execution code including an encrypted MPC encryption/decryption execution code, an encrypted MPC management execution code authentication code, and an encrypted MPC management/setting code, and the SCode management execution code including an encrypted SCode encryption/decryption code and encrypted SCode block area information.

7. The apparatus of claim 4, wherein the SCode blocks include at least one mandatory code block to be invoked during execution of the application program and at least one code block requiring a predetermined parameter.

* * * * *